US008205926B2

(12) United States Patent
Beckley et al.

(10) Patent No.: US 8,205,926 B2
(45) Date of Patent: Jun. 26, 2012

(54) VEHICULAR STORAGE ENCLOSURE

(75) Inventors: Daniel V. Beckley, Byron, MI (US);
Timothy F. O'Brien, White Lake, MI
(US); Jeanette G. Glynn, Orion, MI
(US)

(73) Assignee: Magna International Inc., Aurora (CA)

( * ) Notice: Subject to any disclaimer, the term of this patent is extended or adjusted under 35 U.S.C. 154(b) by 77 days.

(21) Appl. No.: 12/513,562

(22) PCT Filed: Nov. 7, 2007

(86) PCT No.: PCT/US2007/083950
§ 371 (c)(1),
(2), (4) Date: May 5, 2009

(87) PCT Pub. No.: WO2008/058197
PCT Pub. Date: May 15, 2008

(65) Prior Publication Data
US 2010/0067221 A1    Mar. 18, 2010

(51) Int. Cl.
*B60N 3/12* (2006.01)
(52) U.S. Cl. .................................................. 296/37.14
(58) Field of Classification Search ............... 296/37.14,
296/37.1, 37.15, 37.6; 180/321; 224/315;
190/108, 111, 115, 39, 109; 362/496
See application file for complete search history.

(56) References Cited

U.S. PATENT DOCUMENTS

| | | | | |
|---|---|---|---|---|
| 3,016,968 A | * | 1/1962 | Roberts, Jr. et al. | 180/89.1 |
| 4,069,550 A | * | 1/1978 | Silk et al. | 16/361 |
| 4,402,111 A | * | 9/1983 | Selby et al. | 16/308 |
| 4,851,742 A | * | 7/1989 | Chapman | 318/286 |
| 4,998,049 A | * | 3/1991 | Chapman | 318/280 |
| 5,626,380 A | * | 5/1997 | Elson et al. | 296/39.1 |
| 5,636,890 A | * | 6/1997 | Cooper | 296/37.1 |
| 5,979,725 A | * | 11/1999 | Lehrman | 224/539 |
| 6,086,131 A | * | 7/2000 | Bingle et al. | 296/76 |
| 6,209,933 B1 | | 4/2001 | Ang et al. | |
| 6,222,442 B1 | * | 4/2001 | Gager et al. | 340/426.29 |
| 6,254,261 B1 | * | 7/2001 | Bingle et al. | 362/501 |
| 6,308,873 B1 | * | 10/2001 | Baldas et al. | 224/281 |
| 6,349,984 B1 | * | 2/2002 | Marrazzo et al. | 292/336.3 |
| 6,390,529 B1 | * | 5/2002 | Bingle et al. | 296/76 |
| 6,394,511 B1 | * | 5/2002 | Lam et al. | 292/336.3 |
| 6,402,357 B1 | * | 6/2002 | Myers | 362/557 |
| 6,433,292 B1 | * | 8/2002 | Tate | 200/512 |
| 6,460,906 B2 | * | 10/2002 | Bingle et al. | 292/336.3 |
| 6,481,773 B1 | * | 11/2002 | Salani et al. | 296/37.16 |
| 6,485,081 B1 | * | 11/2002 | Bingle et al. | 296/76 |
| 6,527,313 B2 | * | 3/2003 | Takahashi et al. | 292/336.3 |
| 6,692,056 B2 | * | 2/2004 | Bingle et al. | 296/76 |
| 6,783,167 B2 | * | 8/2004 | Bingle et al. | 296/76 |
| 6,880,875 B2 | * | 4/2005 | McClure et al. | 296/37.14 |
| 6,907,643 B2 | * | 6/2005 | Koops et al. | 16/438 |
| 6,929,294 B2 | * | 8/2005 | Byrla et al. | 292/336.3 |
| 6,942,270 B1 | * | 9/2005 | Mulvihill | 296/37.16 |

(Continued)

*Primary Examiner* — Kiran B Patel
(74) *Attorney, Agent, or Firm* — Honigman Miller Schwartz and Cohn LLP

(57) ABSTRACT

A vehicular storage enclosure comprising a sub-compartment (108) disposed within a passenger compartment (P) of a vehicle (V), wherein the sub-compartment (108) includes a closure panel (106) that provides selective access to the sub-compartment (108), wherein the closure panel (106) includes an outboard surface (116) that is substantially exposed to the passenger compartment (106) and an inboard surface (114) that is substantially exposed to the sub-compartment (108) when the sub-compartment (108) is closed off by the closure panel (106), and a handle (204) that is accessible from within the sub-compartment (108), and wherein one of or both of the handle (204) and an area proximate the handle (204) on the inboard surface (114) includes indicia (G) to conspicuously provide one or more instructions for opening the closure panel (106) from within the sub-compartment (108).

11 Claims, 3 Drawing Sheets

U.S. PATENT DOCUMENTS

| | | | |
|---|---|---|---|
| 7,029,138 B2 * | 4/2006 | Tibbenham et al. | 362/84 |
| 7,048,320 B2 * | 5/2006 | Rubel et al. | 296/37.6 |
| 7,097,226 B2 * | 8/2006 | Bingle et al. | 296/76 |
| 7,201,421 B2 * | 4/2007 | Reynolds et al. | 296/37.5 |
| 7,393,037 B2 * | 7/2008 | Hwang | 296/37.14 |
| 7,523,970 B2 * | 4/2009 | Konchan | 292/347 |
| 7,600,800 B2 * | 10/2009 | Suzuki | 296/37.16 |
| 7,794,004 B2 * | 9/2010 | Aebker et al. | 296/37.8 |
| 7,914,074 B2 * | 3/2011 | Lindsay | 297/188.13 |
| 2002/0070574 A1 * | 6/2002 | Carlsson et al. | 296/37.14 |
| 2004/0135390 A1 * | 7/2004 | Gammon | 296/37.1 |

\* cited by examiner

VEHICULAR STORAGE ENCLOSURE

BACKGROUND

1. Technical Field

The invention relates to a storage enclosure including a sub-compartment disposed within a passenger compartment and to a mechanism that permits movement of a closure panel of the storage enclosure.

2. Description of Related Art

Conventional storage compartments are provided within vehicles for stowing a variety of items. Such storage compartments may be located/disposed within a load floor of a vehicle and include a closure panel that provides selective access to the storage compartment.

In some circumstances, the closure panel can include a latch mechanism, designed to move between an unlatched/unlocked state to latched/locked state.

SUMMARY

A vehicular storage enclosure comprising a sub-compartment disposed within a passenger compartment of a vehicle, wherein the sub-compartment includes a closure panel that provides selective access to the sub-compartment, wherein the closure panel includes an outboard surface that is substantially exposed to the passenger compartment and an inboard surface that is substantially exposed to the sub-compartment when the sub-compartment is closed off by the closure panel, and a handle that is accessible from within the sub-compartment, and wherein one of or both of the handle and an area proximate the handle on the inboard surface includes indicia to conspicuously provide one or more instructions for opening the closure panel from within the sub-compartment.

BRIEF DESCRIPTION OF THE DRAWINGS

The present disclosure will now be described, by way of example, with reference to the accompanying drawings, in which.

DETAILED DESCRIPTION

The figures illustrate an exemplary embodiment of a latch mechanism for a closure panel in accordance with an embodiment of the invention. In an embodiment, the latch mechanism is adapted to provide means for a person to readily exit from within the storage enclosure.

For brevity, the disclosure hereof will illustrate and describe a closure panel constructed as a load floor door, but it is appreciated that the closure panel could be any type of door or cover for a storage enclosure and the invention should not be limited to the exemplary closure panel. Moreover, while the illustrated storage enclosure is shown disposed within the rear portion of a vehicle, it is to be understood that the storage enclosure could be provided within any portion of the vehicle and the invention should not be limited to the exemplary illustrations. Based on the foregoing, it is to be generally understood that the nomenclature used herein is simply for convenience and the terms used to describe the invention should be given the broadest meaning by one of ordinary skill in the art.

Figure 1:
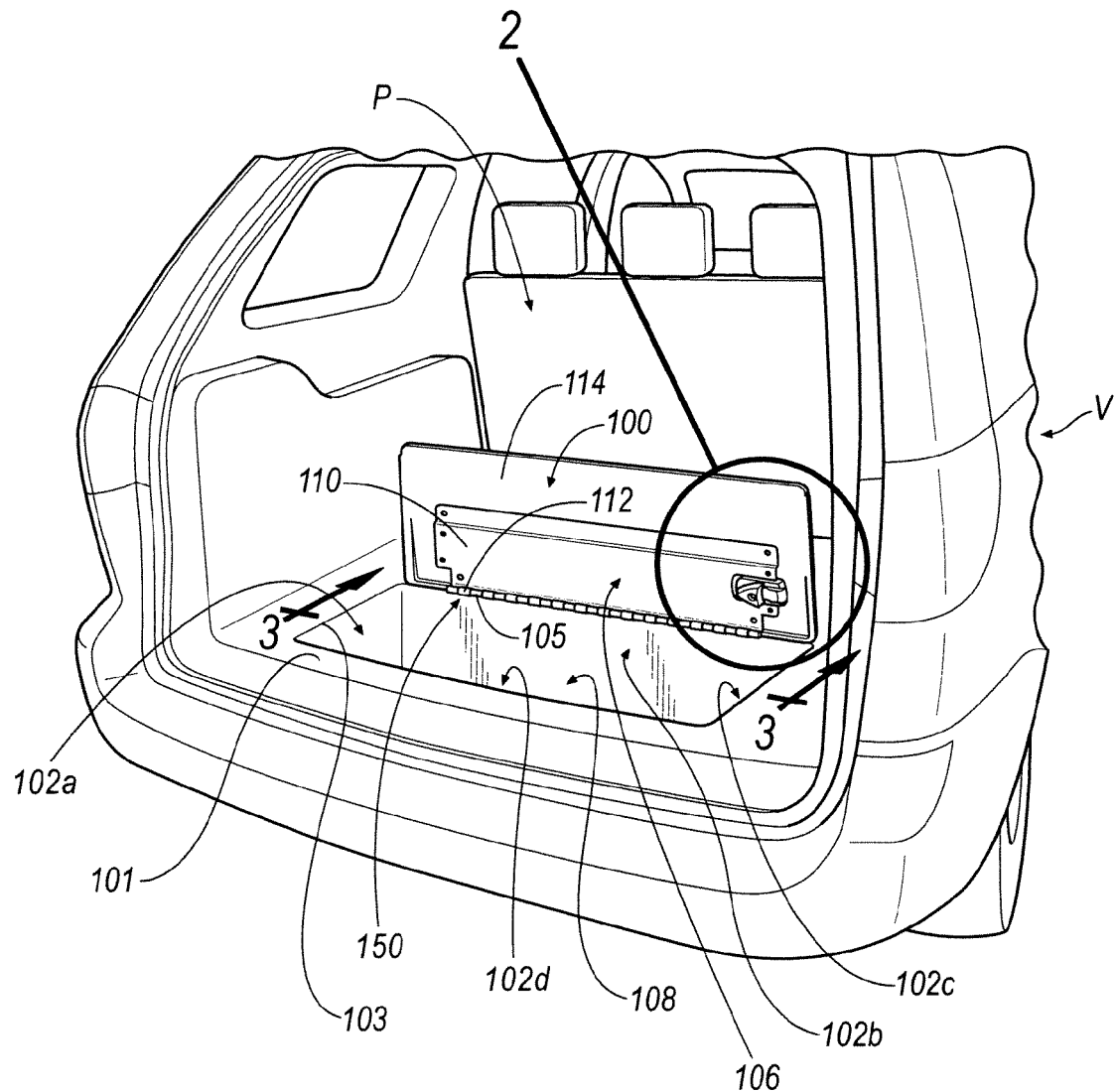
FIG. 1 is a perspective view of a passenger compartment of a vehicle including a storage enclosure in accordance with an exemplary embodiment of the invention.

Referring to FIG. 1, a storage enclosure 100 is disposed in a load floor 101 of a vehicle, V. In an embodiment, the storage enclosure 100 includes a volume that is defined by four sidewalls 102a-102d, a floor portion 104 (FIGS. 3A, 3B), and a closure panel 106. Accordingly, the volume defined by the sidewalls 102a-102d, floor portion 104, and closure panel 106 provides a storage compartment 108 for stowing any desirable number of items, including, for example, groceries, children's toys, an emergency kit, road-side assistance accessories, and the like. It will be appreciated that various configurations of the storage enclosure 100 are known and the invention should not be limited to the arrangement of the storage enclosure 100 illustrated within the Figures.

The closure panel 106 provides selective access to the storage compartment 108. Because the storage compartment 108 is included/located within a passenger compartment, P, it will be appreciated that the storage compartment 108 may be referred to as a sub-compartment within the passenger compartment, P, of the vehicle, V. As provided hereinabove, the remaining portion of this disclosure refers to the closure panel 106 as a load floor door that provides selective access to the storage compartment 108 within the load floor 101, however, it will be appreciated that the invention hereof should not be limited to the exemplarily disclosed embodiments.

As illustrated, a vehicle structure is shown generally at 103 and may include, for example, an edge of the load floor 101 as defined by one or more of the sidewalls 102a-102d that define the storage compartment 108. As shown in FIG. 1, in an embodiment, the edge 103 may include a hinged portion 105 proximate the sidewall 102b.

Figure 2:
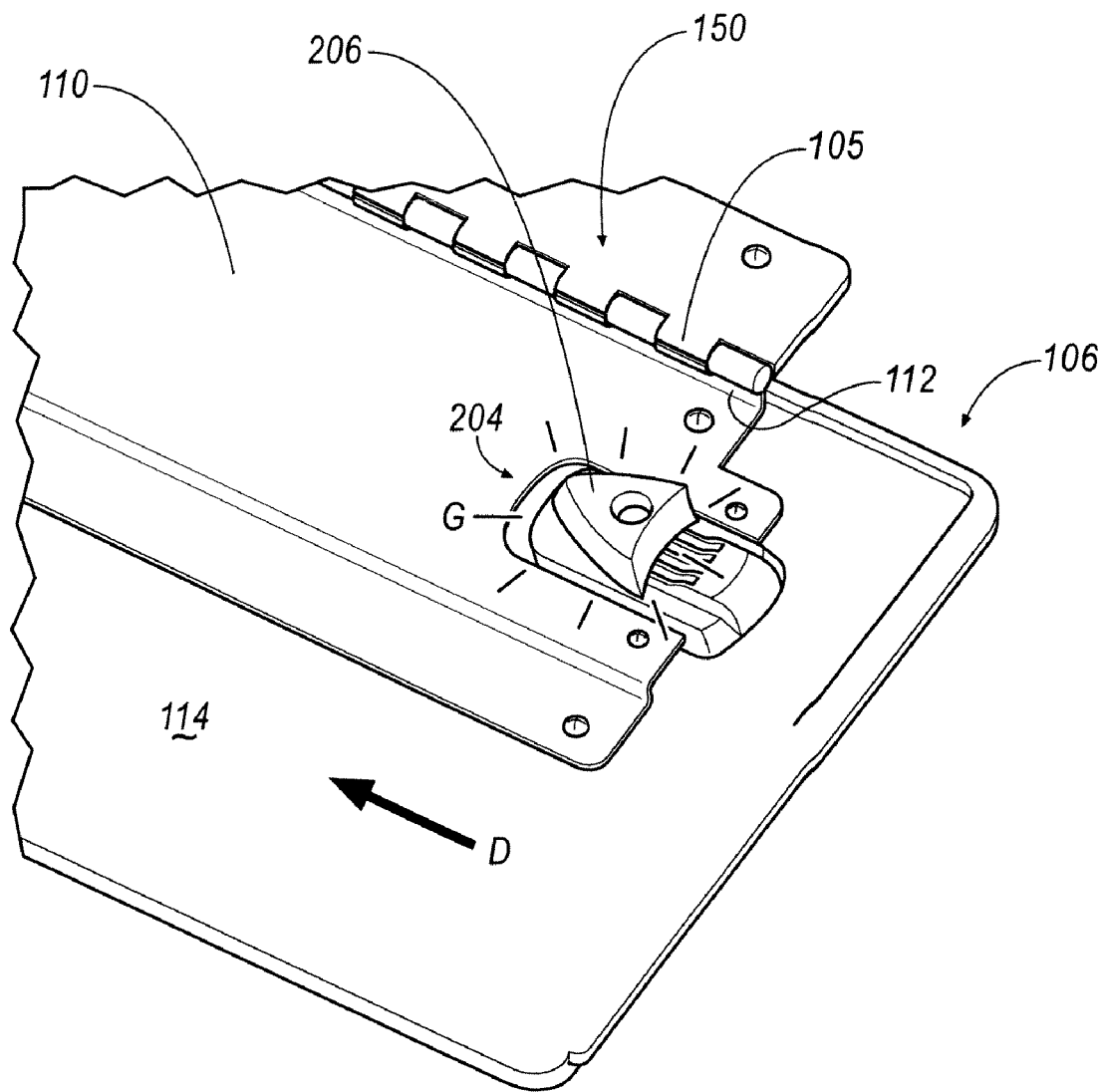
FIG. 2 is an enlarged view of the storage enclosure according to line 2 of FIG. 1.

In an embodiment, load floor door 106 is a body of material having a thickness that is hingably attached to the hinged portion 105 such that load floor door 106 moves relative to the load floor 101. With reference to FIGS. 1 and 2, a hinge panel 110 is provided to hingably-connect the load floor door 106 to the edge 103. According to an embodiment, the hinge panel 110 is fastened to an inboard surface 114 of the load floor door 106.

In an embodiment, the hinge panel 110 of the load floor door 106 includes a hinged portion 112 that correspondingly-meshes with the hinged portion 105 of the edge 103 of the load floor 101 to provide a hingable connection relative one another. As a result, the hinged portions 105, 112 cooperate to provide a hinge means 150 for the storage enclosure 100.

Although a hinge means 150 is disclosed for providing movement of the load floor door 106, it will be appreciated that the invention is not limited to a hinge means 150 and that the load floor door 106 may be moved by any desirable means, such as, for example, a sliding means. A sliding means may be defined by one or more rollers/wheels (not shown) extending from the load floor door 106 that rotates within one or more track members (not shown) that is/are disposed/formed on/in the edge 103 of the load floor 101 thereby providing a sliding means similar to that of conventional "pocket" doors provided in homes, office buildings, or the like.

Figure 3A:
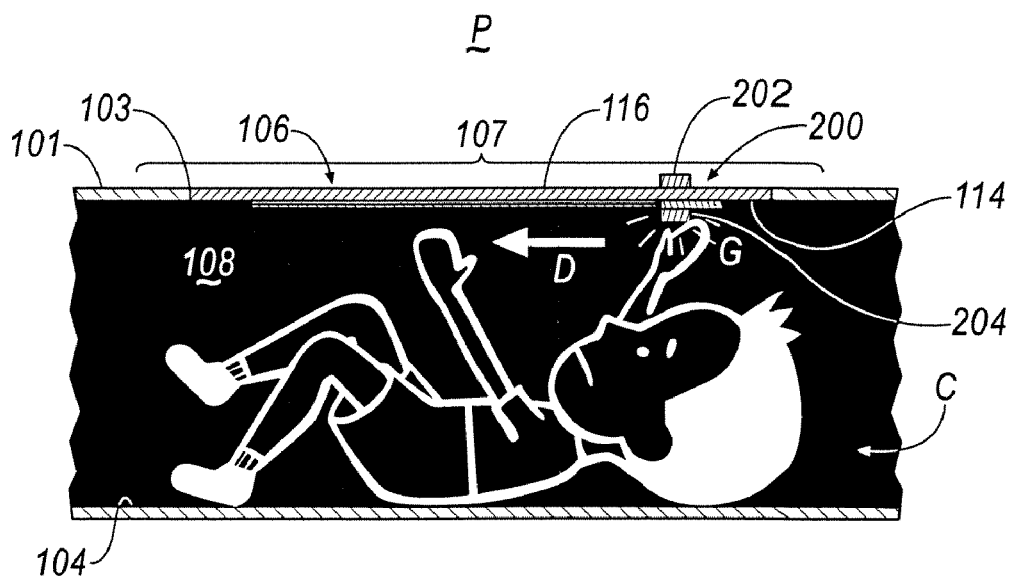
FIG. 3A is a cross-sectional view of a storage enclosure according to line 3-3 of FIG. 1 illustrating a closure panel in a first position in accordance with an exemplary embodiment of the invention.
Figure 3B:
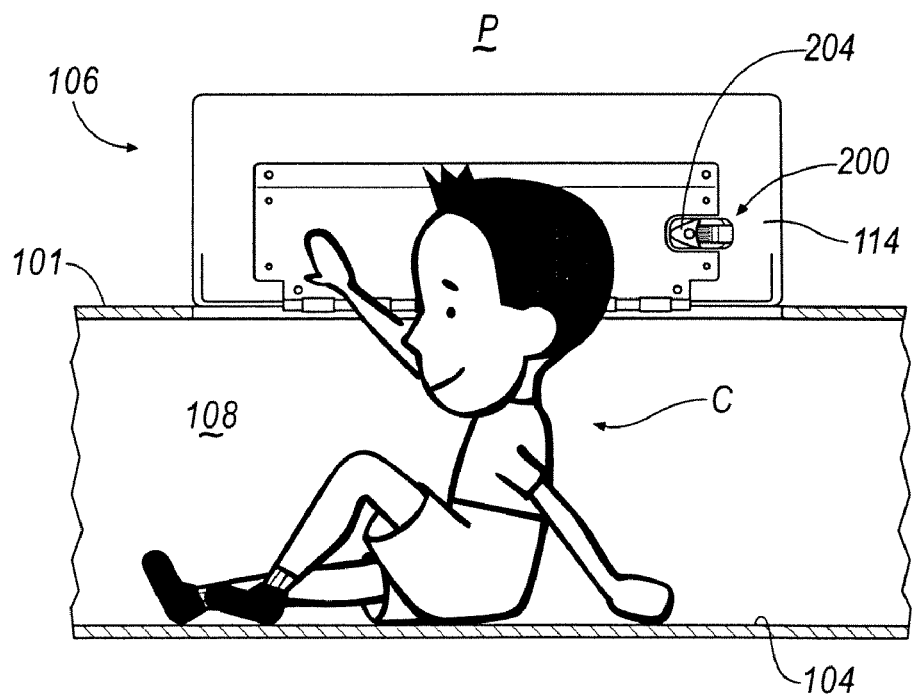
FIG. 3B is another cross-sectional view of the storage enclosure of FIG. 3A with the closure panel in a second position in accordance with an exemplary embodiment of the invention.

With reference now to FIG. 3A, the load floor door 106 may be moved to a first position (i.e., a closed position) such that the load floor door 106 prevents access to the storage compartment 108 from a passenger located in the passenger compartment, P. As such, an outboard surface 116 of the load floor door 106 provides a substantially continuous surface 107 with the load floor 101. Referring to FIGS. 1 and 3B, the load floor door 106 may alternatively be moved to a second position (i.e., an opened position) such that the load floor door 106 permits access to the storage compartment 108 and contents that may be located therein.

When the load floor door 106 is in the first position (i.e., the closed position of FIG. 3A), the hinge means 150 may be latched/locked by way of a means for permitting movement of the closure panel 106. The means for permitting movement of the closure panel 106 may include, for example, a latch mechanism 200. According to an embodiment, the latch mechanism 200 prevents the load floor door 106 from inadvertently being moved from the first position to the second position when the vehicle is, or, is not in use. When so desired by an operator, the hinge means 150 may be unlatched/unlocked by the latch mechanism 200 to permit the load floor door 106 to be moved to/from the first position (i.e., the closed position of FIG. 3A) and the second position (i.e., the opened position of FIG. 3B) when an operator moves an outboard handle 204 of the latch mechanism 200 according to the direction of the arrow, D.

As illustrated, the outboard handle 202 is shown extending from the outboard surface 116 of the load floor 106. According to an embodiment, and explained in further detail below, the latch mechanism 200 may also include an inboard handle 204 that extends from the inboard surface 114 of the load floor door 106. In operation, movement of the inboard handle 204 in the direction of the arrow, D, has a similar unlatching/unlocking effect on the closure panel 106 as described above with respect to the outboard handle 204.

In an embodiment, the inboard handle 204 may be illuminated via an incandescent light source, a light emitting diode and/or may include a "glow-in-the-dark" property, which is shown generally at starbursts, G. Accordingly, as seen in FIG. 3A, it will be appreciated that the glow, G, may provide an illumination to an otherwise darkened storage compartment 108 when the load floor door 106 is moved to the first position; as such, if an operator, such as, for example, a child, C, intentionally, or, unintentionally finds himself/herself locked within the storage compartment 108 when the load floor door 100 is moved to the first position and the latch mechanism 200 is moved to a latched/locked state, the child, C, may easily locate the inboard handle 204 by seeing the glow, G, in the darkness of the storage compartment 108.

Referring to FIG. 2, in a third respect, the inboard handle 204 or the area proximate to the handle 204 may also include a indicia 206. The indicia 206 may include, for example, an arrow, that points in the direction of the arrow, D, that defines a direction to move the latch mechanism 200 so as to unlatch/unlock the hinge means 150.

Accordingly, because the inboard handle 204 may: (a) be located proximate the inboard surface 114, (b) have illumination properties, G, and/or (c) include the arrow indicia 206, the child, C, may (1) easily have access to the latch mechanism 200, (2) locate the latch mechanism, and (3) identify the direction, D, that is needed to move the latch mechanism 200 so that latch mechanism 200 may be unlatched/unlocked. Thus, the child, C, may have access to a means that permits movement of the closure panel 106 of the load floor door 100 from the first, closed position to the second, opened position when the operator or child, C, is located within the storage compartment 108.

Although the handle 204 associated with the latch mechanism 200 is disclosed to include a mechanical hinge means 150, it will be appreciated that the latch mechanism 200 may including an alterative mechanical movement means, such as, for example, a sliding means as described above, rather than a hinge means 150. Additionally, it will be appreciated that although the hinge means 150 and sliding means have been described to include a manually-actuated deployment configuration that is operable according to an application of a force in the direction of the arrow, D, by the person, C, it will be appreciated that the load floor door 106 may alternatively be deployed in an automated system that is powered by an actuator or motor.

According to an embodiment, for example, an automated deployment of the load floor door 106 may include a button 204 having glow-in-the-dark properties, G, and including an indicia/phrase stating "Press Here To Unlatch." Alternatively, for one who is illiterate, a drawing or picture similar to that of FIG. 3B of the present disclosure may be provided on the button 204 to illustrate that, when the button 204 is pressed, the load floor door 106 may automatically or manually open, thereby permitting a person, C, to escape the storage compartment 108. It will be appreciated that a powered, automated system may also be supplemented by a manual, mechanical system as described above in FIGS. 1-3B in the event that the vehicle's battery or power system has been sufficiently discharged or deactivated such that the power system does not permit an automated deployment of the load floor door 106.

The present invention has been described with reference to certain exemplary embodiments thereof However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their equivalents, rather than by the preceding description.

What is claimed is:

1. A vehicular storage enclosure comprising:
   a sub-compartment disposed within a passenger compartment of a vehicle,
   a closure panel movably-connected to the sub-compartment for completely closing-out the sub-compartment when the closure panel is arranged in a closed orientation relative to the sub-compartment, wherein the closed orientation results in ambient light within the passenger compartment of the vehicle not being permitted to enter the sub-compartment, wherein the closure panel includes an outboard surface that is substantially exposed to the passenger compartment and an inboard surface that is substantially exposed to the sub-compartment when the closure panel is arranged in the closed orientation relative to the sub-compartment,
   a handle extending away from the inboard surface of the closure panel, wherein the handle is arranged substantially adjacent the inboard surface of the closure panel, wherein the handle is movably-arranged relative the inboard surface of the closure panel, wherein the handle is accessible from within the sub-compartment when the closure panel is arranged in the closed orientation relative to the sub-compartment, and
   a latching mechanism configured to releasably-hold the closure panel in the closed orientation relative to the sub-compartment, wherein the handle is connected to the latching mechanism, wherein one of or both of the handle and an area proximate the handle on the inboard surface of the closure panel includes indicia to conspicuously provide one or more instructions for re-orientating the closure panel from the closed orientation to an open orientation, wherein a perimeter of the handle defines an arrow, wherein the arrow indicates a direction of slidable movement of the handle for re-orientating the closure panel from the closed orientation to the open orientation.

2. The vehicular storage enclosure according to claim 1, wherein the handle illuminates to conspicuously provide the indicia.

3. The vehicular storage enclosure according to claim 1, wherein the handle illuminates to conspicuously provide the indicia.

4. The vehicular storage enclosure according to claim 1, wherein at least a portion of surface of the handle glows in the dark.

5. The vehicular storage enclosure according to claim 1, wherein at least a portion of surface of the handle glows in the dark.

6. The vehicular storage enclosure according to claim 2, wherein at least a portion of surface of the handle glows in the dark.

7. The vehicular storage enclosure according to claim 3, wherein at least a portion of surface of the handle glows in the dark.

8. The vehicular storage enclosure according to claim 1, wherein the handle is molded from glow-in-the dark material.

9. The vehicular storage enclosure according to claim 1, wherein the handle is molded from glow-in-the dark material.

10. The vehicular storage enclosure according to claim 2, wherein the handle is molded from glow-in-the dark material.

11. The vehicular storage enclosure according to claim 3, wherein the handle is molded from glow-in-the dark material.

\* \* \* \* \*